United States Patent [19]

Liu et al.

[11] 4,015,067

[45] Mar. 29, 1977

[54] METHOD OF PREPARING POLYSACCHARIDE ETHERS AND APPARATUS

[75] Inventors: Gordon Y. T. Liu, Baton Rouge; Carl P. Strange, Walker, both of La.

[73] Assignee: The Dow Chemical Company, Midland, Mich.

[22] Filed: Aug. 18, 1975

[21] Appl. No.: 605,794

[52] U.S. Cl. .................................. 536/96; 536/95; 536/97; 536/99

[51] Int. Cl.[2] ........................................ C08B 11/00

[58] Field of Search ... 260/231 R, 231 A, 231 CM; 536/96, 95

[56] References Cited

UNITED STATES PATENTS

| | | | |
|---|---|---|---|
| 2,476,331 | 7/1949 | Swinehart et al. | 260/231 |
| 3,278,520 | 10/1966 | Klug | 260/231 |
| 3,314,809 | 4/1967 | Klug | 106/197 |
| 3,351,583 | 11/1967 | Bishop | 260/231 |
| 3,453,261 | 7/1969 | Scherff | 260/231 |
| 3,544,556 | 12/1970 | Eichenseer et al. | 260/231 |
| 3,615,254 | 10/1971 | Eichenser et al. | 260/231 R X |
| 3,915,959 | 10/1975 | Goheen et al. | 260/231 CM X |

FOREIGN PATENTS OR APPLICATIONS

| | | | |
|---|---|---|---|
| 632,046 | 12/1961 | Canada | 260/231 CM |

*Primary Examiner*—Lewis T. Jacobs
*Attorney, Agent, or Firm*—David B. Kellom

[57] ABSTRACT

Polysaccharide ethers are prepared in a novel continuous process in which a slurry of a polysaccharide, an alkali metal hydroxide, and an etherifying agent, with or without an inert diluent, are mixed in the substantial absence of molecular or free oxygen and fed through a sinuous tubular reactor under pressure, so that the etherification reaction is continuous. The apparatus for preparing the reaction mixture is also novel.

17 Claims, No Drawings

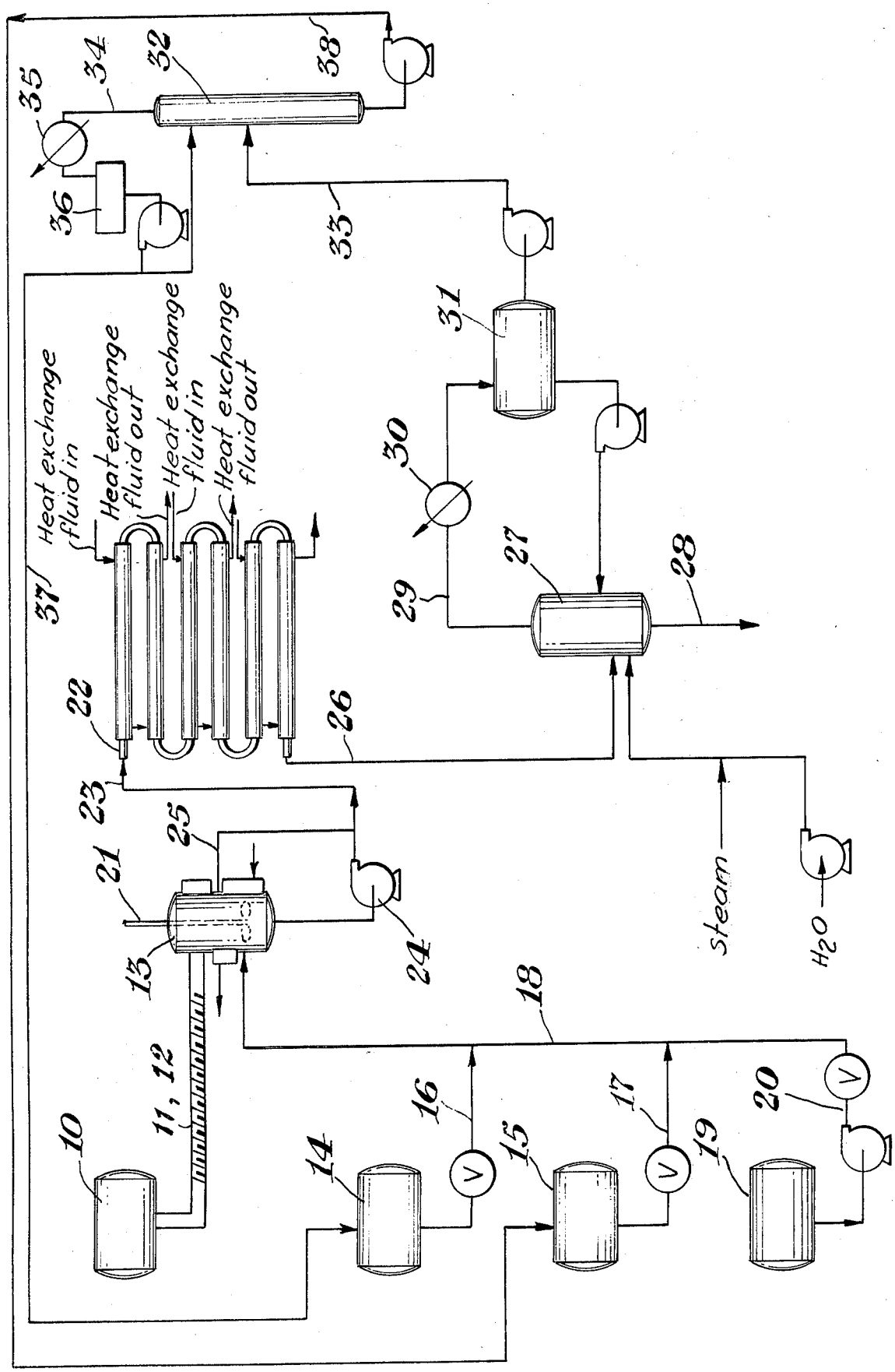

METHOD OF PREPARING POLYSACCHARIDE ETHERS AND APPARATUS

BACKGROUND OF THE INVENTION

Ethers of polysaccharides, including cellulose ethers, are commonly prepared batchwise by first mixing the polysaccharide with a strong alkali, e.g., an aqueous alkali metal hydroxide in the presence of air, and thereafter reacting the alkali-cellulose with an alkyl chloride, a monochloro carboxylic acid or an unsubstituted vicinal epoxide. Usually the alkyl chloride contains from 1 to 2 C atoms, the chloroacid contains from 2 to about 4 C atoms and the epoxide can contain from 2 to about 4 C atoms and it can be halogenated, e.g. epichlorohydrin. The alkyl chlorides react to form alkyl ethers, the chloroacids form carboxyalkyl ethers and the epoxides form hydroxyalkyl ethers. Mixtures of an alkyl chloride and a vicinal epoxide form derivatives having both alkyl ether and hydroxyalkyl ether groups on the polysaccharide. Similarly, a mixture of an alkyl chloride and a chloro carboxylic acid will result in the formation of both alkyl ether and carboxyalkyl ether groups on the polysaccharide. If desired, all three types of alkylating agents can be mixed for reaction with the polysaccharide to form derivatives having alkyl, carboxyalkyl and hydroxyalkyl ether groups on the polysaccharide. The above etherifying ingredients can be used in this invention.

The reaction can be effected in a dry process wherein the alkali metal cellulose, after preparation, is reacted with liquid, non-aqueous reactants mentioned above in quantities insufficient to make a slurry, or it can be effected in the presence of small quantities of water, with or without the presence of an inert diluent.

Since the polysaccharide ethers are made by successive reactions in which an alkali metal polysaccharide is first prepared and thereafter reacted with an etherifying agent for an extended period of time, continuous processes for making polysaccharide ethers have not been given much attention. One such continuous process is described in U.S. Pat. No. 3,544,556, in which an alkali cellulose is prepared in a intermeshing double screw press according to U.S. Pat. No. 3,615,254 and is then fed into one end of a reactor equipped with a screw conveyor and a condenser. Liquid methyl chloride and, if desired, an alkylene oxide, is fed into the reactor near the entry of the alkali cellulose. The quantity of the liquid is 5 to 10 times the weight of the initial cellulosic component. The reactor is jacketed for control of temperature and it also has a reflux system for condensing vapors and returning them to the reactor. The screw conveyor moves the mixture through the reactor to a pressure maintaining exit port opposite the entry. The mixture is washed under pressure with hot water while simultaneously flashing off some of the more volatile reactants. Pressure is reduced in another vessel and unreacted etherifying agents are evaporated, condensed and recycled to the reactor. In this process temperature control through the reaction mass is almost impossible to attain at accelerated reaction rates. In addition, reflux condensers are subject to plugging.

SUMMARY OF THE INVENTION

It has been found that superior control of process variables and, consequently, superior properties in a polysaccharide ether, can be obtained by preparing the alkali-polysaccharide in situ, as a slurry in at least one etherifying agent, in the substantial absence of molecular or uncombined oxygen, and at temperatures which inhibit the reaction with the etherifying agent, or permit it to go to partial completion or to permit it to go to completion before addition of one or more additional etherifying agents. The polysaccharide which is converted to alkali-polysaccharide should be finely comminuted. The alkali metal hydroxide can be, and is preferably, in aqueous solution.

The alkali-polysaccharide slurry is passed substantially continuously through a tubular (sinuous coil) reactor which is free of baffles or other obstructions to the flow of the slurry. The reactor is provided with one or more temperature control zones to allow for optimum control of the reaction occurring within the substantially continuously advancing slurry. In addition to temperature control, provision is also made for addition of one or more of the reactant(s) to the reactor at selected locations under conditions which keep by-product formation at a minimum.

Feed rate and pressure are controlled to maintain the reactor substantially full at the selected reaction temperature.

Discharge from the reactor is effected through a valve and is timed or throttled to provide a controlled pressure release in the reactor, while maintaining substantially continuous flow in the reactor.

BRIEF DESCRIPTION OF THE DRAWING

The drawing shows a block flow diagram of the process wherein the reactants are mixed in a slurry tank or kettle 13, passed through a tubular reactor 22. The reaction products are removed from the reactor through line 26, stripped of excess etherifying ingredients in a steam still 27, and then passed through a purification and recovery train (not shown).

The above process has several important benefits over prior art processes. Localized over heating, which is responsible for run away reactions, and which is largely due to poor heat transfer properties of the polysaccharides is avoided or greatly minimized. Thus, formation of nonuniformly reacted products which result in gelled solids and/or fibers upon dissolution is avoided or minimized. The non-uniform products can occur even in localized hot spots. The control and removal of the exothermic heat of reaction is a highly important factor in the production of high quality polysaccharide ethers.

General or localized overheating also results in unwanted side reactions and, therefore, a waste of reagents. Unwanted side reactions also create problems of waste disposal of the by-products.

Current processes involving gas phase reactions or stirred, solid or semi-fluid masses, which require conveyors or similar types of mixing equipment to move the reaction mass, suffer serious deficiencies in quality product production, because of inefficiency in controlling the heat of reaction, thereby generating unwanted by products.

The use of slurries which can be pumped under controlled conditions of temperature, pressure and flow rate provides a major advance in overcoming the deficiencies of current processes. By maintaining substantially continuous flow of the slurry the reaction can proceed smoothly to completion with optimum heat transfer. In addition, with the process of this invention one or more of the reactants can be added stepwise or at spaced positions along the tubular reactor. It is thus possible to control the alkali concentration during the reaction to obtain more uniform substitution of ether groups on the polysaccharide and to improve reaction efficiency.

The formation of the alkali-polysaccharide in situ in a liquid medium provides means for reducing exposure to oxygen and consequently, limits greatly the degree of degradation or depolymerization that occurs when alkali and a polysaccharide are mixed in the presence of molecular oxygen. Because of the limited degradation polysaccharide ethers, the production has a comparatively high viscosity at low concentrations in aqueous media. The ratio of length to cross-section of the reactor can range from about 5 to about 2000, and preferably from about 100 to about 800.

The process of this invention comprises the following steps:

1. Preparing a slurry of a finely divided polysaccharide, an aqueous alkali metal hydroxide, and at least one etherifying ingredient, in the substantial absence of free or uncombined oxygen and at a temperature at which the reaction between the alkali-polysaccharide and etherifying ingredient is controlled, 2. Feeding said slurry substantially continuously into a tubular reactor which is free of obstructions that would impede the flow of the slurry, 3. Adjusting the temperature of the slurry to that at which a controlled reaction between the etherifying ingredient or ingredients and alkali-polysaccharide takes place to generate the desired substitution, 4. Continuing the said reaction for a period of from about 10 to about 180 minutes during which the slurry passes through the reactor, 5. Removing the slurry from the reactor, and 6. Purifying and recovering the polysaccharide ether.

Unreacted reagents from step 6 can be recycled to the etherification procedure.

DETAILED DESCRIPTION OF THE INVENTION

The invention is hereafter described by reference to the drawing, and with cellulose as a representative polysaccharide.

Finely divided cellulose powder, linters or wood pulp, is fed by known means such as a worm screw 11, from pressurized hopper 10 through line 12 to a slurry tank or kettle 13. One or more liquid etherifying ingredients is fed to the slurry kettle either separately or together, represented here as vessels 14, 15 through valved lines 16 and 17 into line 18, which leads into slurry kettle 13. This arrangement permits feeding one or two etherifying ingredients together or independently to the slurry kettle 13. However it is understood that three or more etherifying ingredients can be employed in this process by merely adding feed vessels or blending etherifying ingredients in one or more of the vessels. An inert diluent can also be fed with one or more of the etherifying ingredients, if desired, through line 16 or 17 or both.

Aqueous alkali which can be any alkali metal hydroxide, but preferably sodium or potassium hydroxide, and most preferably sodium hydroxide, is also fed to slurry kettle 13 from vessel 19 through valved line 20 through line 18. It is to be understood, however, that the alkali can be fed directly into the slurry kettle through an entirely separate line without prior commingling with etherifying ingredient or diluent or both.

Slurry kettle 13 is equipped with a stirrer 21 for rapid agitation of the cellulose, aqueous alkali and etherifying ingredient(s). The amount of etherifying agent and/or diluent is sufficient to form a slurry with the cellulose alkali mixture. The amount of etherifying ingredient and inert diluent, if one is used, should be from about 10 to about 20 times the weight of the initial cellulose.

From kettle 13, the slurry mixture is fed to a sinuous reactor 22, through line 23 at a pressure of from about 100 to about 400 psig by means of a pump 24. A bypass line 25, connects line 23, with kettle 13 to provide for improved agitation of the slurry during periods when slurry is not being fed into reactor 22. The tubular reactor can be jacketed so that all sections can be operated at a single uniform temperature or each section can have any predetermined temperature during passage of the reactants through the reactor. The large length to cross-section ratio permits very accurate control of temperature during the entire reaction cycle and inhibits backmixing thereby providing more uniform substitution. In addition, the time of reaction or passage through the reactor can be accurately controlled by regulating the feed rate to the reactor.

The reactor can be made from a series of pipes with elbow connections between stages or straight pipe segments. With such a construction, the number of stages and the diameter of different stages can be varied to any desired number and volume and, in addition, provision can be made for injection of reactants at any part of the reactor (not shown). For example, if an alkylene oxide, such as ethylene oxide is one of the etherifying ingredients it can be added to the system at a point where the caustic to cellulose ratio is low. This will improve reaction efficiency for adding hydroxy-ethyl groups to the cellulose molecule.

Passage of the slurry from reactor 22, through line 26, is effected through differential pressure, and sent to a steam still 27. The steam still contains water having a temperature sufficiently high to evaporate excess etherifying ingredients. The etherified cellulose, however, remains as a slurry in water. The slurry is removed from still 27 through line 28 and is sent to a purification and recovery train (not shown).

Overhead vapors from still 27 pass through line 29, through condenser 30 and into holding tank 31. From the latter the overhead condensate is sent to column 32, through line 33. The lowest boiling ingredient is vaporized and passes through line 34 into condenser 35, and the liquefied product is collected in tank 36. A portion of the liquid in tank 36 is returned to column 32 as reflux and the remainder is pumped through line 37 into vessel 14 for recycle to the slurry kettle. The higher boiling etherifying ingredient is withdrawn from column 32 through line 38, and returned to vessel 15 for recycle to the slurry kettle.

The amount of NaOH should be sufficient to obtain the desired degree of etherification of the polysaccharide. For cellulose from 0.25 to 1.7 parts by weight of NaOH, or the equivalent for KOH, should be used. The preferred amount is from 0.5 to 1.2 and most preferred is 0.4 to 0.9 part NaOH per part of cellulose, usually added as 50% NaOH or the equivalent amount of KOH. Preferably the alkali hydroxide is a solution containing 25–73 percent alkali and most preferably 40–50 percent alkali. The alkali can also be added as a dry mix of 100 percent NaOH and pulp. The amount of water can range from 0–3 weight parts per part of cellulose, preferably from 0.6 to 1.1 parts of water on the weight of cellulose.

The amount of etherifying agent must be sufficient to give the desired number of ether groups on the polysaccharide.

When haloalkyl hydrocarbons, such as methyl, ethyl, propyl or butyl chlorides are used for etherifying cellulose the amount of methyl chloride can range from 2–20 parts by weight of the cellulose and preferably from 6 to 12 weight parts provided the liquid to pulp ratio is maintained at least at 10–20 to 1. Equivalent weight parts of the higher alkyl chlorides can be used for the operable and preferred ranges. Mixtures of alkyl chlorides in any proportion can also be used within the above ranges.

For preparing hydroxyalkyl ethers by reaction with epoxides the weight ratio of ethylene oxide to cellulose can be the same as that of methyl chloride and equivalent ratios for the propylene and 1,2-butylene oxide can be used. Mixtures of epoxides in any proportion can also be used.

For preparing carboxy alkyl ethers, monochloroacetic acid or its alkali metal salt can be used in the same molar ratios as methyl chloride, or the equivalents of the higher acids. Mixtures of higher monochlorocarboxylic acids or salts in any proportion can be employed.

With epichlorohydrin, in the molar ratios given for the alkyl chlorides, the product formed is predominantly a polysaccharide having

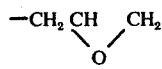

groups attached to the polysaccharide through an ether linkage. The epoxide can also be hydrolyzed to a diol, cross-linked to another polysaccharide chain or it can be polymerized by known means. It is to be understood that other epoxides with a terminal chloride group can also be used including $C_4$ monochloroepoxides.

Mixtures of any of the above etherifying ingredients can be employed in combined molar ranges given above for alkyl chlorides.

The preferred etherifying agents are mixtures of an alkyl chloride and a $C_2$–$C_3$ epoxide, and most preferable is a mixture of methyl chloride with at least one of ethylene oxide and propylene oxide, in amount sufficient to form a slurry, which is in a range of 10–40 parts by weight of the mixture of etherifying agents per part of cellulose or other polysaccharide and in a combined ratio of about 11 of the alkyl chloride per part of alkylene oxide.

The temperature of the reaction will depend in part on the reactivity of the etherifying agent and in part on the time for passage of the mixture through the reactor. It is understood that in general the higher the temperature the more rapid the reaction rate. Also, it is known that alkylene oxides will react with alkali polysaccharides at much lower temperatures (e.g. 30°–50° C.) than alkyl chlorides. However, a temperature of from about 30 to about 135° C. is operable and a preferable range is from about 65°–90° to about 110° C.

The reaction is carried out under a pressure of 100 to 400 psig, preferably 200–350 psig. Representative inert diluents which can be used include, but are not limited to, an excess of alkyl chloride, dimethyl ether, hexane, benzene or toluene. When dimethyl ether is the diluent it should not exceed about 60% by volume of the mixture with alkyl chloride.

The time of reaction will vary between about 10 minutes and about 180 minutes. Usually 30 minutes will suffice to complete the reaction, depending on the reactivity of the etherifying agent in part and the temperature but a reaction period of from about 30 to about 60 minutes is preferred.

The examples which follow are intended to illustrate but not limit the invention. All parts and percentages are given by weight, unless otherwise specified.

EXAMPLE 1

The reactor for this example was a sinuous, six-tiered, vertical jacketed reactor. Each tier consisted of a corrosion resistant metal tube 25 feet long and 3 inches in diameter. The tiers were interconnected through metal elbows, as shown in the drawing.

A feed of 20 pounds of finely divided cellulose, 40 pounds of 50 weight percent aqueous NaOH, 90 pounds of propylene oxide and 200 pounds of methyl chloride per hour was sent to the slurry pot, in the substantial absence of air. The slurry was agitated continuously and pumped into the reactor at a rate to provide a reaction period of about 30 minutes. The temperature in the reactor was adjusted to 80° C. Pressure in the reactor was about 300 psig. The product was removed through a pressure actuated valve (not shown in drawing) set to open at 300 psig. The product, thereafter, was separated and purified. The methyl, hydroxypropyl substituted cellulose from this run had an average methyl substitution of 27.5 percent and a hydroxypropyl substitution of 6.5 percent. A 2 weight percent solution in water (0.05 percent undissolved solids) had a viscosity of 14,000 centipoise. The excess propylene oxide is steam distilled and fed to column 32 where it is fractionated and returned for recycle to the reactor.

EXAMPLE 2

In this continuous run a slurry was made by feeding 20 pounds of finely divided cellulose, 40 pounds of 50 weight percent NaOH, 110 pounds of propylene oxide and 165 pounds of methyl chloride per hour to the slurry pot. The slurry was agitated continuously and pumped to the reactor under 300 psig pressure. Residence time in the reactor was about 30 minutes. The temperature ranged from about 80° to about 110° C. The separated and purified product had an average methyl substitution of 29.1 percent and a hydroxypropyl substitution of 10.0 percent. A 2 weight percent aqueous solution had a viscosity of 5,972 centipoise. The undissolved solids content was 0.1 percent. Unreacted propylene oxide was recovered and recycled to the etherification reactor.

EXAMPLE 3

The reactor of Examples 1 and 2 was used for this run. A feed to the slurry pot consisted of 20 pounds of ground cellulose, 36 pounds of 50 weight percent aqueous NaOH, 130 pounds of methyl chloride, and 130 pounds of propylene oxide per hour. The mixture was agitated continuously during the run and pumped to the reactor at ambient temperature at a pressure of about 300 psig. The temperature during the reaction ranged from about 65° to about 100° C. Residence time in the reactor was about 30 minutes. After separation and purification of the product, it had methyl substitution of 20.3 percent and hydroxypropyl substitution of 21.0 percent. The insoluble solids content was 0.5 percent. This cellulose ether was soluble in methanol.

EXAMPLE 4

A series of cellulose derivatives having methyl, hydroxyethyl and hydroxypropyl ether groups was prepared. In each case the equipment described above was used. A slurry was made by feeding to the reactor a finely divided cellulose and 0.5 pound of NaOH in aqueous solution per pound of cellulose. In addition to the cellulose and NaOH various weight ratios of reactants based on the weight of cellulose (tabulated below), were added. The temperature and time of each run are included in the table. The mixture was held at 40° C for one hour with all reagents present and then the temperature was raised to the maximum indicated and held for the time indicated in the table.

TABLE I

| Weight Ratio | Run No. | | | | |
|---|---|---|---|---|---|
| | 1 | 2 | 3 | 4 | 5 |
| Propylene Oxide | 7.0 | 7.0 | 7.0 | 8.0 | 9.0 |
| Methyl Chloride | 7.0 | 7.0 | 7.0 | 6.0 | 5.0 |
| Ethylene Oxide | 2.0 | 2.0 | 2.0 | 2.0 | 2.0 |
| Max. Temp. ° C | 60 | 70 | 80 | 80 | 80 |
| Time Hrs. at Max. Temp. | 2.5 | 1.0 | 0.5 | 1.0 | 1.5 |

The production from each run was analyzed for ether groups on the cellulose molecule. The data are provided in Table II, below.

TABLE II

| Run No. | Substitution | | |
|---|---|---|---|
| | Methyl | Hydroxyethyl | Hydroxypropyl |
| 1 | 14.6 | 30.3 | 12.6 |
| | 1.23DS | 1.3MS | 0.44MS |
| 2 | 14.8 | 29.0 | 12.7 |
| | 1.23DS | 1.23MS | 0.44MS |
| 3 | 14.9 | 27.5 | 12.9 |
| | 1.23DS | 1.15MS | 0.44MS |
| 4 | 16.2 | 17.5 | 14.4 |
| | 1.37DS | 1.18MS | 0.5MS |
| 5 | 16.9 | 31.3 | 13.4 |
| | 1.49DS | 1.40MS | 0.49MS |

DS = Degree of Substitution
MS = Molar Substitution

The process of this invention can be used for the preparation of methyl cellulose by reacting cellulose, an alkali metal hydroxide and methyl chloride. When either ethylene oxide or propylene oxide is the sole etherifying ingredient for cellulose, the product formed is, respectively, hydroxyethyl cellulose and hydroxypropyl cellulose. A mixture of ethylene oxide and propylene oxide, when reacted with cellulose, forms an end product having both hydroxyethyl and hydroxypropyl ether groups on the cellulose molecule. In a similar manner, a cellulose ether having both hydroxyethyl and hydroxybutyl ether groups can be made by reacting cellulose with a mixture of ethylene oxide and 1,2-butylene oxide. Also, when a mixture of methyl chloride and 1,2-butylene oxide is used as the etherifying mixture for cellulose the end product has both methyl and hydroxybutyl ether groups.

The polysaccharide ethers of this invention all have utility as thickening agents for neutral to alkaline aqueous systems and all are useful as mucilages or glues. Thus, methyl cellulose is useful for thickening foods of various types and for use in mucilages or glues. Hydroxyethyl and hydroxypropyl cellulose or a cellulose having both hydroxyethyl and hydroxypropyl ether groups or hydroxyethyl and hydroxybutyl ether groups are useful for forming films and coatings, as laundry additives, paper additives and latex paint thickeners, as well as other known utility. A particularly good latex paint thickener is a hydroxyethyl methyl cellulose. The cellulose derivatives with methyl, hydroxyethyl and hydroxypropyl ether groups can be used for coating paper or as a thickener for latex paints or other aqueous media in neutral to alkaline systems. The product with methyl and hydroxybutyl ether groups on the cellulose molecule has good surfactant properties.

A uniform procedure for purification of the polysaccharide ethers of this invention can be employed. The product removed from the bottom of the steam still 27 is filtered and washed, then dried and ground to the desired degree of fineness. The washing step is effected under conditions wherein the polysaccharide ether is insoluble, e.g., at a temperature above which the product is insoluble or under mildly acid conditions for carboxyl containing derivatives. If desired, the product can be lightly cross-linked with a dialdehyde, e.g., succinaldehyde and washed at low temperature to reduce the salt content.

We claim:

1. A method of preparing an ether of a polysaccharide comprising
   1. continuously preparing a slurry of a finely divided polysaccharide, an alkali metal hydroxide in an amount sufficient to provide from about 0.25 to about 1.7 parts by weight based on the polysaccharide, and an etherifying ingredient with or without an inert carrier fluid in the substantial absence of free oxygen,
   2. feeding said slurry into a tubular reactor, free of obstructions to passage of the slurry, under a pressure of from about 100 to about 400 psig at a rate to provide a reaction period of from about 10 to about 60 minutes at a temperature of from about 30 to about 135° C.
   3. removing the reacted slurry from the reactor and
   4. purifying and recovering the ether of the polysaccharide.

2. The method of claim 1 in which the pressure is 200–350 psig and the temperature ranges from about 90° to about 110° C.

3. The method of claim 2 in the slurry based on a part of cellulose consists essentially of from about 0.25 to about 1.7 parts by weight of NaOH, from about 0.6 to about 20 parts by weight of CH$_3$Cl, from about 0.6 to about 20 parts by weight of propylene oxide, the pressure is from 300 psig and the temperature ranges from about 65° to about 90° C.

4. The method of claim 3 in which the NaOH content is from about 0.5 to about 1.2 parts by weight per part of cellulose.

5. The method of claim 1 in which the slurry based on one weight part of cellulose consists essentially of from about 0.25 to about 1.7 parts by weight of NaOH, from about 0.6 to about 20 parts by weight of ethylene oxide, and from about 0.6 to about 20 parts by weight of CH$_3$Cl, the pressure is about 300 psig and the temperature ranges from about 65° to about 100° C.

6. The method of claim 1 in which the NaOH is added as a 40–73 percent aqueous solution.

7. The method of claim 1 in which alkali is 73–100 percent.

8. The method of claim 1 in which the slurry, based on a part of cellulose, consists essentially of about 1 part of NaOH, about 4.5 parts propylene oxide, and about 10 parts of MeCl, the pressure is about 300 psig and the temperature is about 65° C.

9. The method of claim 1 in which the slurry, based on a pound of cellulose, consists essentially of about one part by weight of NaOH, about 8.25 parts by weight of $CH_3Cl$ and about 5.5 parts by weight of propylene oxide, the pressure is about 300 psig and the reaction temperature is from about 70° to about 90° C.

10. The method of claim 1 in which the slurry, based on a pound of cellulose, consists essentially of about 0.9 part of NaOH, about 6.5 parts of $CH_3Cl$ and about 6.5 parts of propylene oxide, the pressure is about 300 psig and the temperature is from about 65° to about 90° C.

11. The method of claim 2 in which the unreacted $CH_3Cl$, propylene oxide and by-product dimethyl ether are recovered and recycled to the slurry.

12. The method of claim 1 in which the etherifying ingredient is methyl chloride.

13. The method of claim 1 in which the etherifying ingredient is propylene oxide.

14. The method of claim 1 in which the etherifying ingredients contain a mixture of ethylene oxide and propylene oxide.

15. The method of claim 1 in which a mixture of methyl chloride, ethylene oxide and propylene oxide is the etherifying ingredient.

16. The method of claim 1 in which the etherifying ingredient is a mixture of ethylene oxide and butylene oxide.

17. The method of claim 1 in which the etherifying ingredient is a mixture of methyl chloride and butylene oxide.

* * * * *